US012071330B2

(12) United States Patent
Huber et al.

(10) Patent No.: US 12,071,330 B2
(45) Date of Patent: Aug. 27, 2024

(54) LIFTING PLATFORM FOR MOTOR VEHICLES

(71) Applicant: Nussbaum Custom Lifts GmbH, Kehl (DE)

(72) Inventors: Ludwig Huber, Willstätt (DE); Steffen Nussbaum, Strasbourg (FR)

(73) Assignee: Nussbaum Custom Lifts GmbH, Kehl (DE)

( * ) Notice: Subject to any disclaimer, the term of this patent is extended or adjusted under 35 U.S.C. 154(b) by 364 days.

(21) Appl. No.: 17/551,692

(22) Filed: Dec. 15, 2021

(65) Prior Publication Data

US 2022/0106173 A1 Apr. 7, 2022

Related U.S. Application Data

(63) Continuation-in-part of application No. 16/298,191, filed on Mar. 11, 2019, now abandoned.

(30) Foreign Application Priority Data

Mar. 12, 2018 (DE) ........................ 102018105573.0

(51) Int. Cl.
*B66F 7/28* (2006.01)

(52) U.S. Cl.
CPC ..................................... *B66F 7/28* (2013.01)

(58) Field of Classification Search
CPC ...... B66F 7/28; B66F 7/20; B66F 7/04; B66F 7/02; B66F 3/02; B66F 3/46; B66F 3/36
See application file for complete search history.

(56) References Cited

U.S. PATENT DOCUMENTS

| | | | | | |
|---|---|---|---|---|---|
| 4,212,449 | A * | 7/1980 | Tsujimura | B66F 7/04 | 187/219 |
| 4,776,569 | A * | 10/1988 | Nestel-Eichhausen | B66F 7/22 | 254/133 R |
| 4,934,487 | A * | 6/1990 | Isogai | B66F 7/04 | 254/89 R |
| 5,954,160 | A * | 9/1999 | Wells, Sr. | B66F 7/28 | 414/427 |
| 6,866,124 | B1 * | 3/2005 | Barkis | B66F 7/025 | 414/233 |
| 9,701,526 | B2 | 7/2017 | Benz | | |
| 9,714,160 | B2 | 7/2017 | Benz | | |
| 9,840,402 | B2 | 11/2017 | Horimitzu | | |
| 2012/0325587 | A1 * | 12/2012 | Matthews | B66F 7/28 | 187/216 |
| 2016/0122168 | A1 * | 5/2016 | Benz | B66F 7/28 | 254/133 R |

* cited by examiner

*Primary Examiner* — Seahee Hong
(74) *Attorney, Agent, or Firm* — Volpe Koenig

(57) ABSTRACT

An exemplary lifting platform for motor vehicles has four supporting arms that are pivotally mounted on a lifting device, especially on two lateral lifting columns, and the free ends of which are movable under support points of a motor vehicle being raised. The supporting arms form a first pair and a second pair of supporting arms. At least the supporting arms of the first pair of supporting arms are adjustable in length and are implemented in the form of rigid supporting arms, which are pivotable solely about their articulation points on the lifting device. The supporting arms of the second pair of supporting arms are in the form of double-jointed arms having an additional articulated joint and, in the retracted state, are typically at least twice as long as the supporting arms of the first pair of supporting arms.

20 Claims, 9 Drawing Sheets

LIFTING PLATFORM FOR MOTOR VEHICLES

CROSS-REFERENCE TO PRIORITY APPLICATION

This application is a continuation of U.S. application Ser. No. 16/298,191, filed Mar. 11, 2019, which claims the benefit of pending German Application No. 10 2018 105 573.0 ("Hebebuhne fur Kraftfahrzeuge"; filed Mar. 12, 2018, at the German Patent Office), which is hereby incorporated by reference in its entirety.

FIELD OF THE INVENTION

The present invention relates to a lifting platform for motor vehicles.

BACKGROUND

Column lifting platforms having supporting arms are known in various embodiments. On the free ends of the supporting arms there are usually supporting plates that must be positioned under the manufacturer's designated support points on the underside of the motor vehicle. Because the vehicle dimensions and therefore the position of the support points on different vehicles differ considerably, the supporting arms can be adjusted in length telescopically.

Furthermore, column lifting platforms are also known in which the four supporting arms are in the form of double-jointed arms so, in addition to normal passenger vehicles, it is also possible to accommodate larger vehicles, such as transporters and vans, for which the adjustment range of straight telescopic supporting arms is insufficient.

Moreover, also known are column lifting platforms having straight supporting arms, the front supporting arms of which are considerably shorter than the rear supporting arms. In relation to a raised vehicle, the lifting columns are therefore not located in the center of the vehicle in the longitudinal direction of the vehicle but rather in the front third of the vehicle, so that the vehicle doors can be fully opened without obstruction.

Finally, German Patent No. DE 18 16 919, U.S. Pat. No. 4,212,449, and German Patent No. DE 23 52 159 disclose column lifting platforms having two rigid supporting arms and two supporting arms in the form of double-jointed arms. The double-jointed arms are in each case shorter than the rigid supporting arms. These patent publications, as well as commonly assigned German Patent Publication No. 199 59 835, are hereby incorporated by reference in their entirety.

In conventional lifting platforms having supporting arms, a frequent problem is that, in the event of repair work to the underbody, the supporting arms are in the way or render such work more difficult. This especially applies to motor vehicles having an electric drive, the batteries of which are increasingly being installed in the bottom of the vehicle. The maintenance and replacement of such batteries are achieved via maintenance flaps, which are usually located on the underbody of the motor vehicles. It has now been found that with some vehicles having an electric drive, the supporting arms of conventional lifting platforms obstruct opening these maintenance flaps on the vehicle underbody, rendering maintenance and replacement of the batteries more difficult.

SUMMARY

The problem addressed by the present invention is therefore to define a lifting platform for motor vehicles that can be used more flexibly, is space-saving, and, above all, is also suitable for the repair and maintenance of modern motor vehicles having an electric drive.

An exemplary lifting platform has four supporting arms that are pivotally mounted on a lifting device (e.g., especially on two lateral lifting columns), the free ends of which are movable under support points of a motor vehicle being raised. The supporting arms form a first pair and a second pair of supporting arms. At least the supporting arms of the first pair of supporting arms are adjustable in length and are implemented in the form of rigid supporting arms, which are pivotable solely about their articulation points on the lifting device. Meanwhile, the supporting arms of the second pair of supporting arms are in the form of double-jointed arms having an additional articulated joint.

In one aspect, the lifting platform according to the present invention provides that the supporting arms of the second pair of supporting arms are at least twice as long as the supporting arms of the first pair of supporting arms in the retracted state (e.g., the retracted state both of the rigid supporting arms and of the double-jointed arms, insofar as the latter are also telescopically extendable) and the articulated joints are constructed in such a way that, for positioning under the support points of a motor vehicle being raised, the supporting arms of the second pair of supporting arms, starting from a maximally extended position of the relevant supporting arm, can be bent horizontally in both directions.

In this way, motor vehicles can be held in such a way that the supporting arms are not in the way during repair work. This is achieved especially by the articulated joints of the supporting arms of the second pair of supporting arms being able to be bent in both directions. In particular, it can be provided that, for positioning the rear supporting arms under the vehicle being raised, the articulated joints thereof can be bent inwards toward the respective opposite lifting column. The rear supporting joints can accordingly be bent, as desired, in such a way that their articulated joint faces outwards in a direction away from the vehicle as well as inwards under the vehicle. Bending the articulated joint outwards provides maximum freedom under the vehicle for work on the bottom of the vehicle, whereas, when the articulated joints are bent inwards, maximum working space remains free in the region of the vehicle sills (e.g., for welding work on the sills or for work on lines laid along the sill).

The ability to bend the double-jointed supporting arms in both directions as desired in order to accommodate a vehicle is made possible by the lengths of the supporting arms of the two pairs of supporting arms being asymmetric, so that the double-jointed arms of the second pair of supporting arms are considerably longer than the rigid supporting arms of the first pair of supporting arms. Only in that way does the required space under the vehicle become free when the double-jointed arms are bent and the supporting arms of the two pairs of supporting arms are not in each other's way. Furthermore, a vehicle can be held in such a way that, in the raised state, the center point of the vehicle and, above all, the vehicle doors are located in front of the lifting device, especially in front of the lateral lifting columns. Accordingly, the doors of the raised vehicle can be fully opened without obstruction.

In addition to a two-column lifting platform, other lifting platforms having supporting arms, such as a ram-lifting platform or a two-ram lifting platform, are also possible and included within the scope of the present invention.

In an exemplary embodiment, the supporting arms of the rear pair of supporting arms are longer than the supporting arms of the front pair of supporting arms by at least an amount such that, for raising a motor vehicle, the supporting arms can be positioned so that the lifting columns of the lifting platform are at the level of, or even in front of, the A-column (e.g., A-pillar) of the vehicle. This ensures the vehicle doors of a vehicle parked in the lift position can be opened. The lifting columns of the lifting platform can therefore be arranged closer together, so that the lifting platform can be of narrower construction. This enables more lifting platforms and associated assembly bays to be accommodated on the same surface area of a workshop.

Typically, the supporting arms of the front pair of supporting arms are implemented as three-part, telescopic supporting arms. This allows a wide range of adjustment.

For safety reasons, the articulated joints of the double-jointed arms can also be provided with a supporting-arm detent device, which is activatable or is activated to lock the articulated joint before the motor vehicle is raised and which is released for adjusting the position of the supporting arm.

The rear supporting arms can likewise be implemented to be adjustable in length similarly to the front supporting arms, although this is not required. The positioning of the free ends of the supporting arms can also be achieved by simply altering the bending angle and pivoting angle of the rear supporting arms.

In an exemplary embodiment, however, the rear supporting arms, which are implemented as double-jointed arms, are also adjustable in length and have for that purpose a rear-supporting-arm part and a front-supporting-arm part connected thereto via the articulated joint, the front-supporting-arm part being configured to be telescopically adjustable in length. The ability to adjust the length of the double-jointed arm can thus be realized in a technically simple way and the rear supporting arms thereby allow more flexible positioning on the model-dependent support points of different vehicles and, in addition, require less space. In particular, it can be provided that each front-supporting-arm part, at its free end, carries a receiving plate with which the motor vehicle is raised at its support points.

While the supporting arms of the front pair of supporting arms are typically in the form of three-part telescopic arms, it is sufficient that, as with an exemplary length adjustment of the rear supporting arms, the front-supporting-arm part thereof is in the form of a two-part telescopic arm.

In a lifting platform having two lifting columns, a further advantage is obtained by mounting the articulation points of the short, rigid supporting arms of the first pair of supporting arms on the inner side of the lifting columns facing towards the opposite lifting column, while the articulation points of the double-jointed supporting arms are located on a front or rear side of the lifting columns, seen in the drive-in direction. This provides the rigid supporting arms of the first pair of supporting arms with maximum freedom of movement and the double-jointed arms of the second pair of supporting arms with the greatest possible reach or adjustment range below a vehicle being raised.

The foregoing illustrative summary, as well as other exemplary objectives, properties, and/or advantages of the invention, and the manner in which the same are accomplished, are further explained within the following detailed description and its accompanying drawings.

BRIEF DESCRIPTION OF THE DRAWINGS

The drawings are provided as examples, may be schematic, and may not be drawn to scale. The present inventive aspects may be embodied in many different forms and should not be construed as limited to the examples depicted in the drawings.

DETAILED DESCRIPTION

In this detailed description, various aspects and features are herein described with reference to the accompanying figures. These aspects and features generally pertain to exemplary lifting platforms for motor vehicles.

Specific details are set forth to provide a thorough understanding of the present disclosure. It will be apparent, however, to those having ordinary skill in the art that the disclosed lifting platforms may be practiced without some or all of these specific details. As another example, features disclosed as part of one embodiment can be used in the context of another embodiment to yield a further embodiment. In some instances, well-known aspects have not been described in detail to avoid unnecessarily obscuring the present disclosure. This detailed description is therefore not to be taken in a limiting sense, and it is intended that other embodiments are within the spirit and scope of the present disclosure.

As noted, the present invention relates to a lifting platform for motor vehicles. An exemplary lifting platform has four supporting arms that are pivotally mounted on a lifting device, especially on two lateral lifting columns, and the free ends of which are movable under support points of a motor vehicle being raised. The supporting arms form a first pair and a second pair of supporting arms. At least the supporting arms of the first pair of supporting arms are adjustable in length and are implemented in the form of rigid supporting arms, which are pivotable solely about their articulation points on the lifting device. The supporting arms of the second pair of supporting arms are in the form of double-jointed arms having an additional articulated joint.

Figure 1:
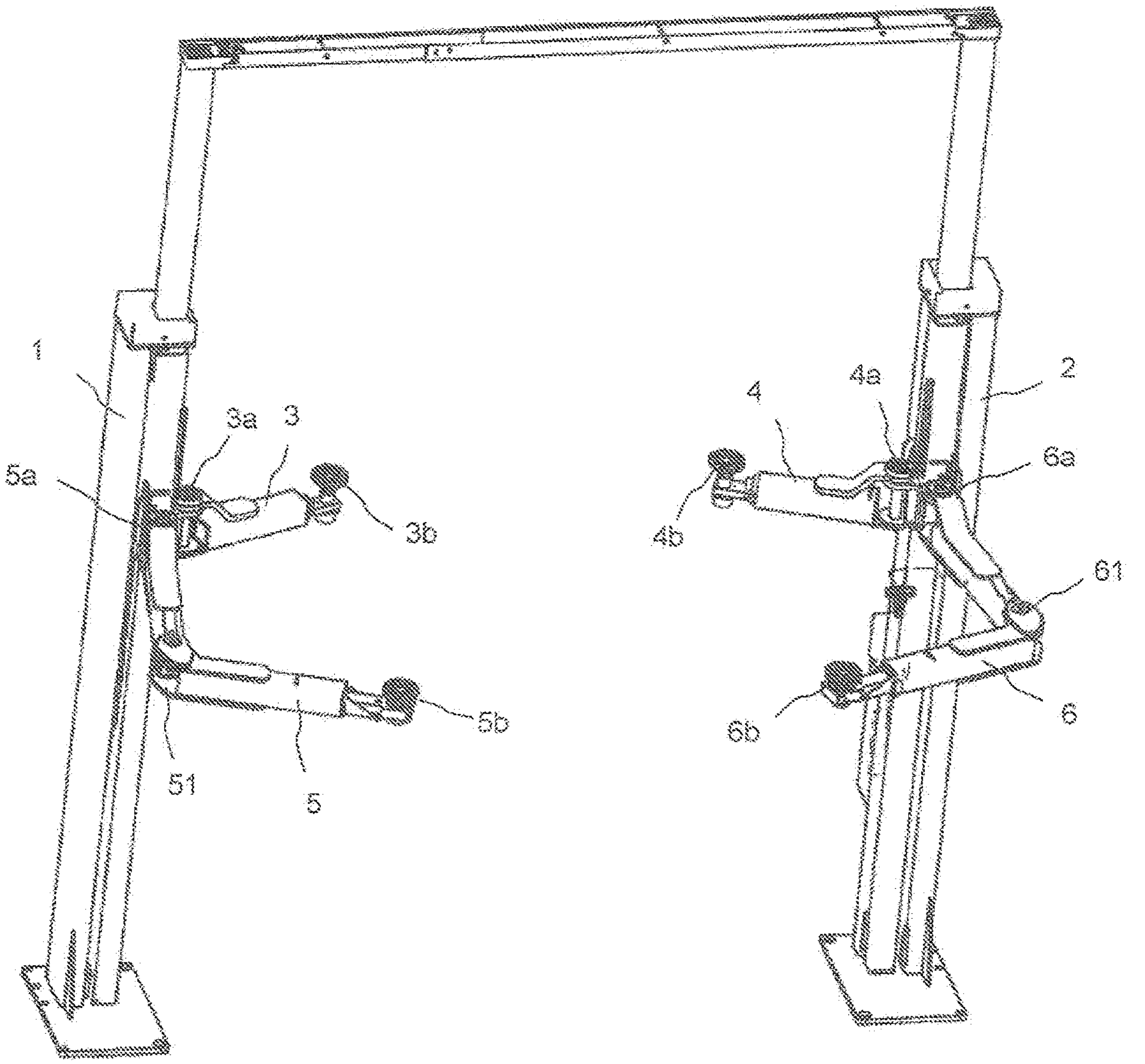
FIG. 1 shows a two-column lifting platform having two rigid supporting arms and two double-jointed supporting arms.
Figure 2:
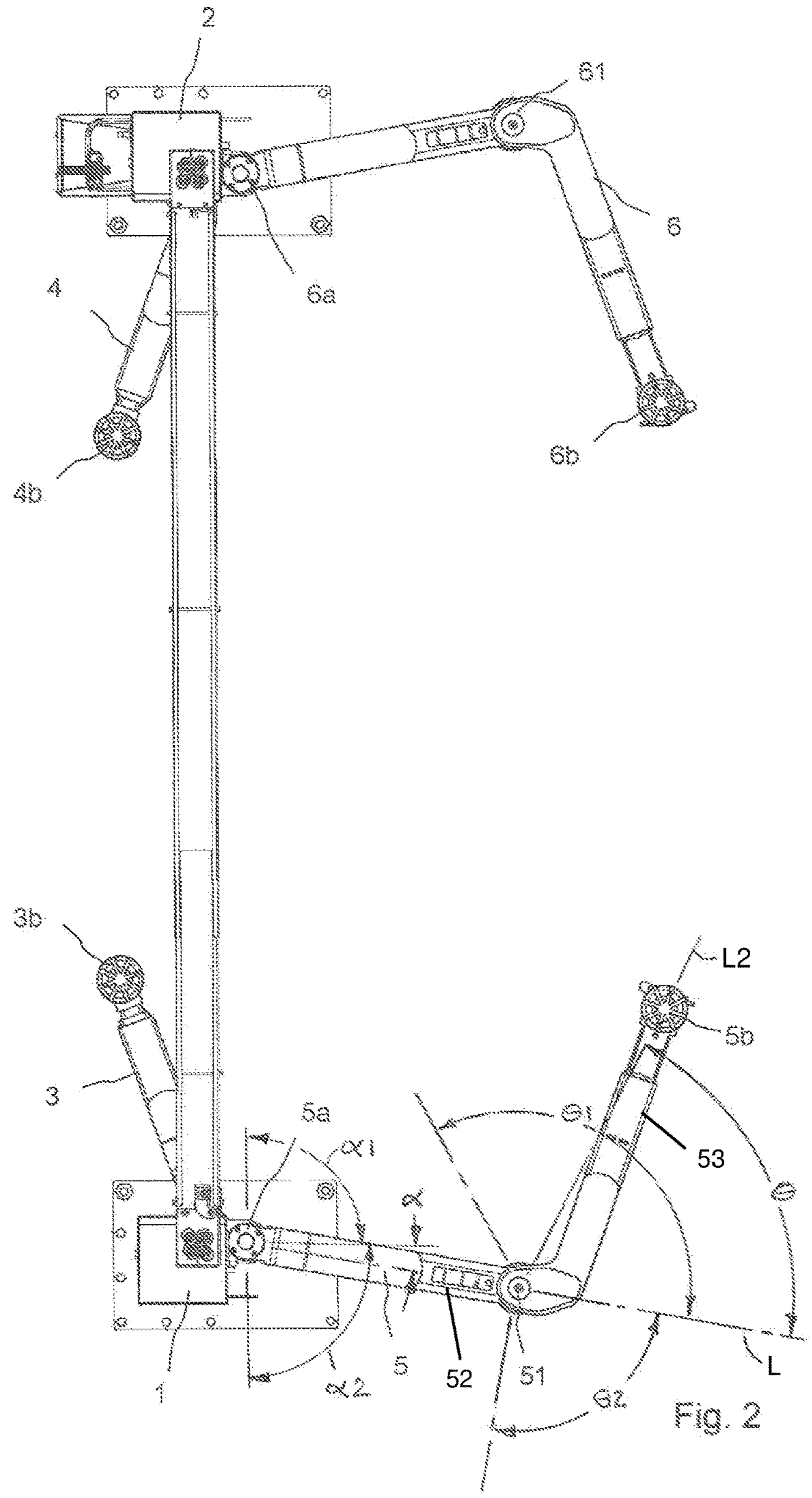
FIG. 2 is a plan view onto the lifting platform from FIG. 1.

The lifting platform shown in FIGS. 1 and 2 comprises two lifting columns 1, 2 on each of which two supporting arms 3, 5 and 4, 6, respectively, are pivotally articulated. The supporting arms 3, 5, 4, 6 are adjustable in height (i.e., the supporting arms can be raised and lowered). The lifting drive inside the lifting columns 1, 2 is achieved in a manner known per se, such as by means of cylinder-piston units, by means of a threaded spindle, or by means of a chain drive.

The supporting arms 3, 4 form a front pair of supporting arms (e.g., they raise the front half of the vehicle), and the supporting arms 5, 6 form a pair of supporting arms for the rear half of the vehicle. The supporting arms 3, 5 for the left-hand side of the vehicle are arranged mirror-symmetrically with respect to the supporting arms 4, 6 for the right-hand side of the vehicle. The supporting arms are each pivotally mounted on their associated lifting column 1, 2 via a pivot bearing 3*a*, 4*a*, 5*a*, 6*a*, so they can be pivoted under a vehicle positioned between the lifting columns 1, 2 and moved to the support points on the bottom of the vehicle.

Supporting plates 3*b*, 4*b*, 5*b*, 6*b* having rubber pads are arranged at the free ends of the supporting arms 3, 4, 5, 6 in the usual way, the supporting plates coming into contact with the vehicle when the supporting arms are raised. The supporting plates 3*b*, 4*b*, 5*b*, 6*b* can also be adjusted in height to a certain extent relative to the associated supporting arms 3, 4, 5, 6 by means of a thread.

The supporting arms 3, 4 of the front pair of supporting arms are implemented in the form of conventional rigid supporting arms (e.g., they are pivotable solely about their respective articulation points 3*a*, 4*a* on the columns 1, 2). Furthermore, the front supporting arms 3, 4 can be adjusted in length telescopically. In an exemplary embodiment, the adjustment range of the front supporting arms 3, 4 is between 570 millimeters in the fully retracted state and 1160 millimeters in the fully extended state. To achieve such a wide adjustment range, the front supporting arms 3, 4 are constructed in the form of three-part telescopes (e.g., having three rectangular profiles pushed one inside the other telescopically). End stops in the interior of the telescope profiles prevent the supporting arms 3, 4 from being extendable farther than is permissible.

Unlike the front supporting arms 3, 4, the supporting arms 5, 6 of the rear pair of supporting arms are in the form of double-jointed arms. They are provided with an additional articulated joint 51, 61 so that the corresponding supporting arm 5, 6 can be bent in its pivot plane, which is defined by the pivot joint 5*a*, 6*a*.

Figure 3:
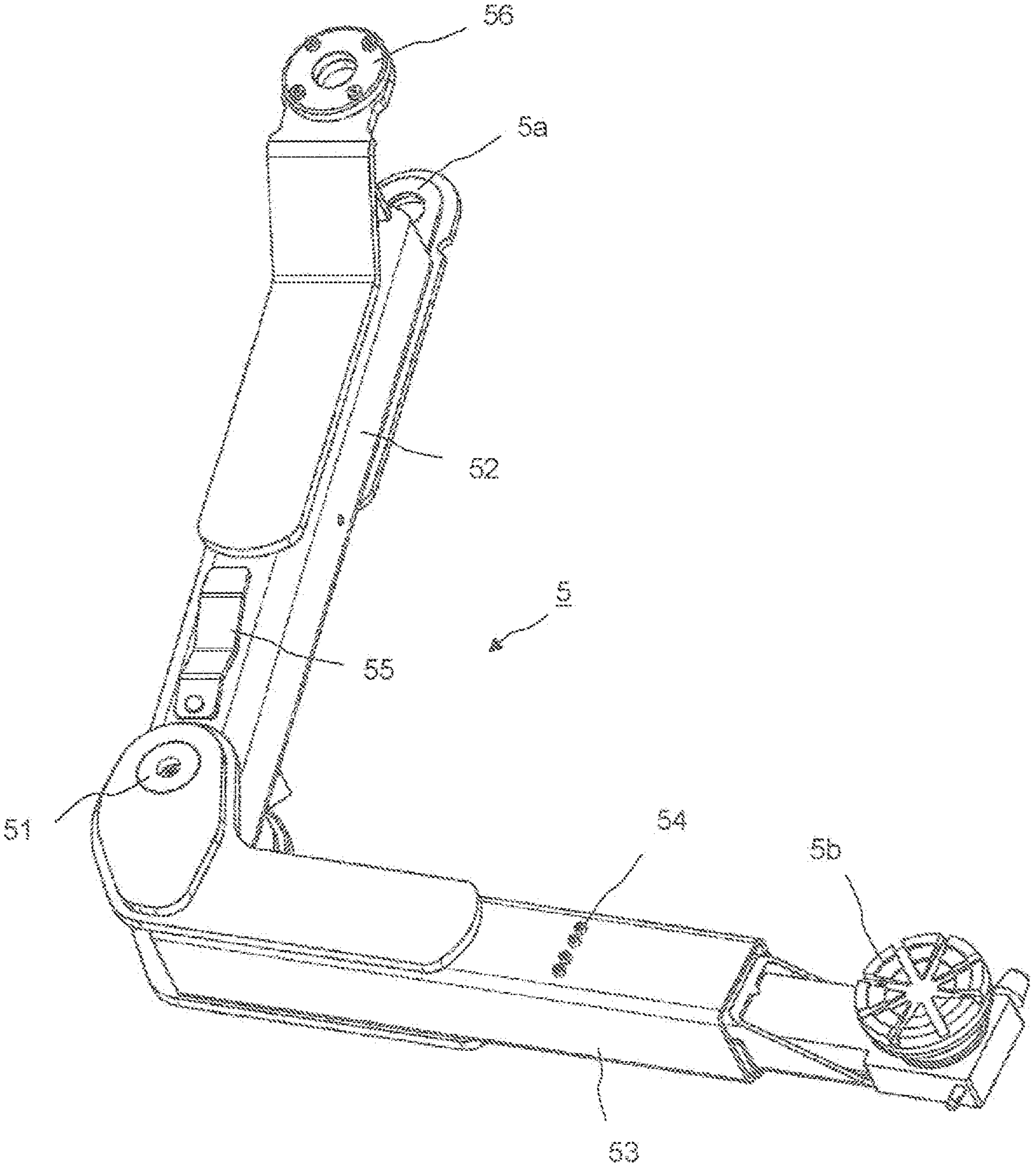
FIG. 3 is an enlarged view of a double-jointed supporting arm of the lifting platform from FIG. 1.

The left-hand double-jointed arm 5 is shown on an enlarged scale in FIG. 3. The supporting arm 5 includes a rear-part-arm or rear-supporting-arm part 52 (e.g., inner-supporting-arm part), which is connected to the lifting column 1 via the pivot bearing 5*a* and articulatedly connected to a front-part arm or front-supporting-arm part 53 (e.g., outer-supporting-arm part) via the articulated bearing 51. The front-part arm 53 is adjustable in length telescopically and carries the receiving plate 5*b* on its free, front end. The telescopic mechanism of the front-part arm 53 is a two-part construction, including an outer and an inner telescope profile, which can be pushed one inside the other. An end stop, of which only the external fixing screws 54 are shown in FIG. 3, is screwed in place on the inner side of the outer telescope profile and delimits the range of extension of the telescopic-part arm 53. In an exemplary embodiment, the maximum length of the rear supporting arms 5, 6 when the articulated joint 51, 61 is extended is a maximum of 1825 millimeters.

As shown in FIG. 2 in connection with supporting arm 5, the rear-part arm 52 connected by the pivot joint 5*a* to the column 1 defines a longitudinal arm axis L, and the front-part arm 53 connected by the articulated joint 51 to the end of the rear-part arm 52 defines a longitudinal arm axis L2 between the articulated joint 51 and the support plate 5*b*. The rear-part arm 52 is preferably pivotable from a medial position, normal to a line extending between the lifting columns, by a first angle $\alpha\mathbf{1}$ inwardly and a second angle $\alpha\mathbf{2}$ outwardly, with $\alpha\mathbf{1}$ and $\alpha\mathbf{2}$ both being at least 45° and more preferably up to about 90°. The actual position of the rear-part arm 52 from the medial position is indicated as a. The front-part arm 53 is preferably pivotable from a medial position defined by the longitudinal arm axis L by a first positioning angle θ1 inwardly, and by a second positioning angle θ2 outwardly. Preferably, θ1 and θ2 are both 90° or greater. Based on the configuration of the front-part arm 53, in this embodiment, θ1 can be up to about 135°. In this case θ indicates the actual position of the longitudinal arm axis L2. The supporting arm 6 is configured mirror-symmetric to the supporting arm 5. With this configuration, the supporting arms 5, 6 can be bent horizontally in both directions such that the articulated joints 51, 61 are positionable inwardly in an inner position that is adapted to be underneath the motor vehicle being raised or outwardly in an outer position that is adapted to be laterally outside of the motor vehicle being raised.

It will be understood that exemplary lifting platforms according to the present invention are not limited to two-part telescopic extension of the rear supporting arms 5, 6. Rather, if advantageous, the rear supporting arms 5, 6 may be provided with three-part telescopic extension.

The articulated joint 51 of the double-jointed arm 5 is provided with a supporting-arm detent device, which locks the articulated joint 51 when a motor vehicle is being raised. For adjustment of the supporting arm, the supporting-arm detent device can be unlocked by means of an operating lever 55. The supporting-arm detent device is here formed by a toothed disc having circumferential toothing, which is arranged in the interior of the articulated joint 51, and by a locking member operable by means of the unlocking lever 55. This locking member engages between the teeth of the toothed disc and blocks a rotary movement or, in the raised state, allows such movement.

The pivot joints 3*a*, 4*a*, 5*a*, 6*a* with which the supporting arms 3, 4, 5, 6 are articulated on the lifting columns 1, 2 are also lockable in a similar way. For example, for that purpose, the disc 56 arranged on the pivot bearing 5*a* in FIG. 3 can be provided in the form of a toothed disc having circumferential toothing in which a locking member arranged on the lifting column 1 engages to block a pivoting movement of the supporting arm 5.

Figure 4:
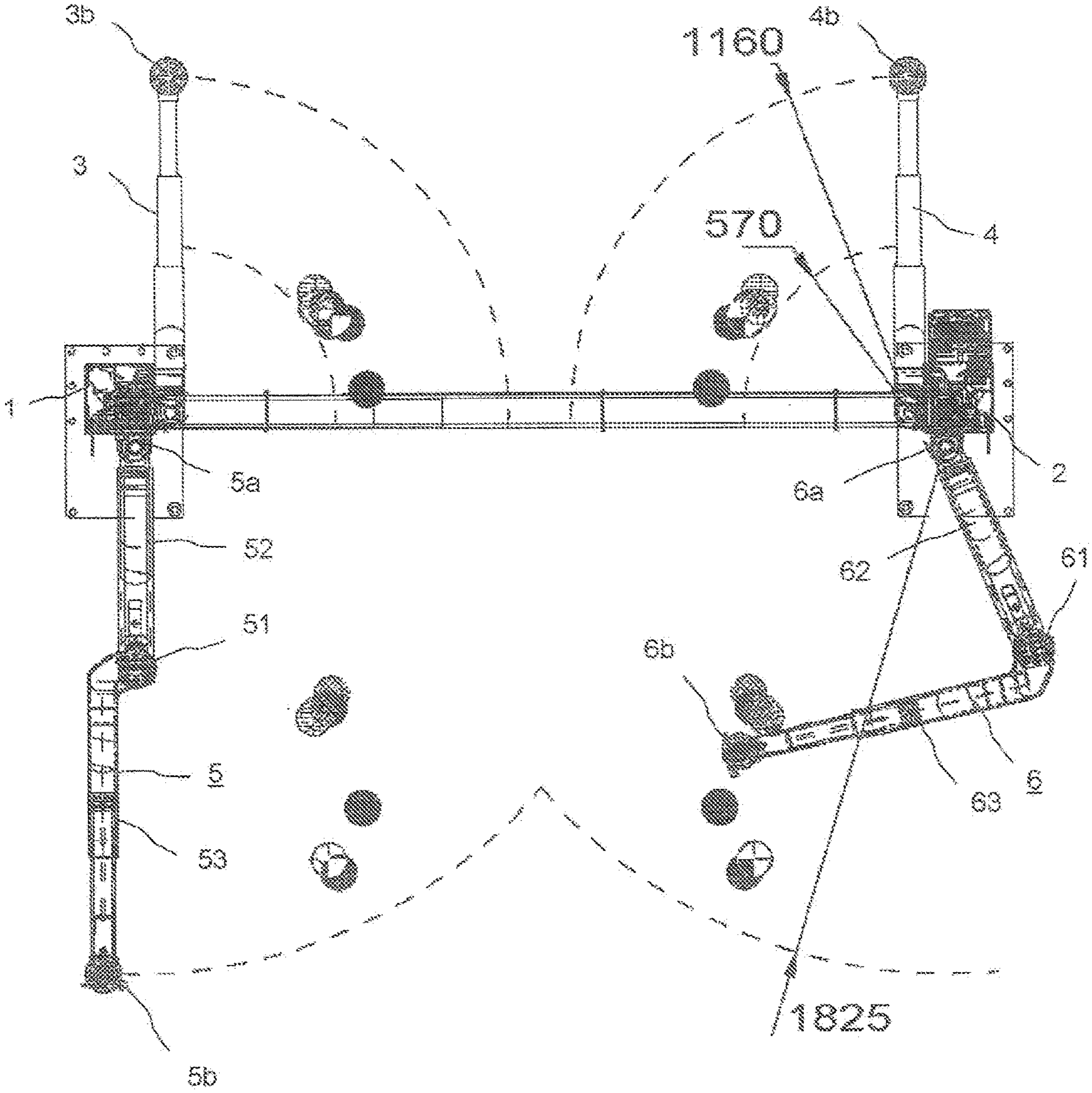
FIG. 4 shows support positions of the supporting plates for different kinds of vehicles in relation to the lifting platform from FIG. 1.

By way of example, FIG. 4 shows the manufacturer's designated positions of the support points for different kinds of vehicles. It will be seen that the rear supporting arms 5, 6 have been sharply bent so as to arrive at such a support position. Accordingly, the rear supporting arms 5, 6 do not run transversely across the underbody, and so maintenance flaps on the vehicle underbody, such as are required for batteries of an electric drive, remain freely accessible. Also shown is the three-part telescopic extension of the front supporting arms 3, 4.

Because of the asymmetric lengths of the supporting arms (e.g., relatively short front supporting arms 3, 4 and relatively long, bendable rear supporting arms 5, 6), it is possible for a vehicle positioned between the lifting columns 1, 2 to be raised in such a way that the center of the vehicle and, above all, the vehicle doors are located in front of the lifting columns 1, 2 in the drive-in direction. When a vehicle is in the raised position, the lifting columns 1, 2 are typically located at approximately the level of, or even in front of, the A-column (A-pillar) of the vehicle, so the vehicle doors can be opened without the lifting columns 1, 2 being in the way. In this way, the lifting platform can be of narrow construction with the lifting columns 1, 2 arranged close to one another. In an exemplary embodiment, the width of the lifting platform is only about 3 meters.

Figure 5:
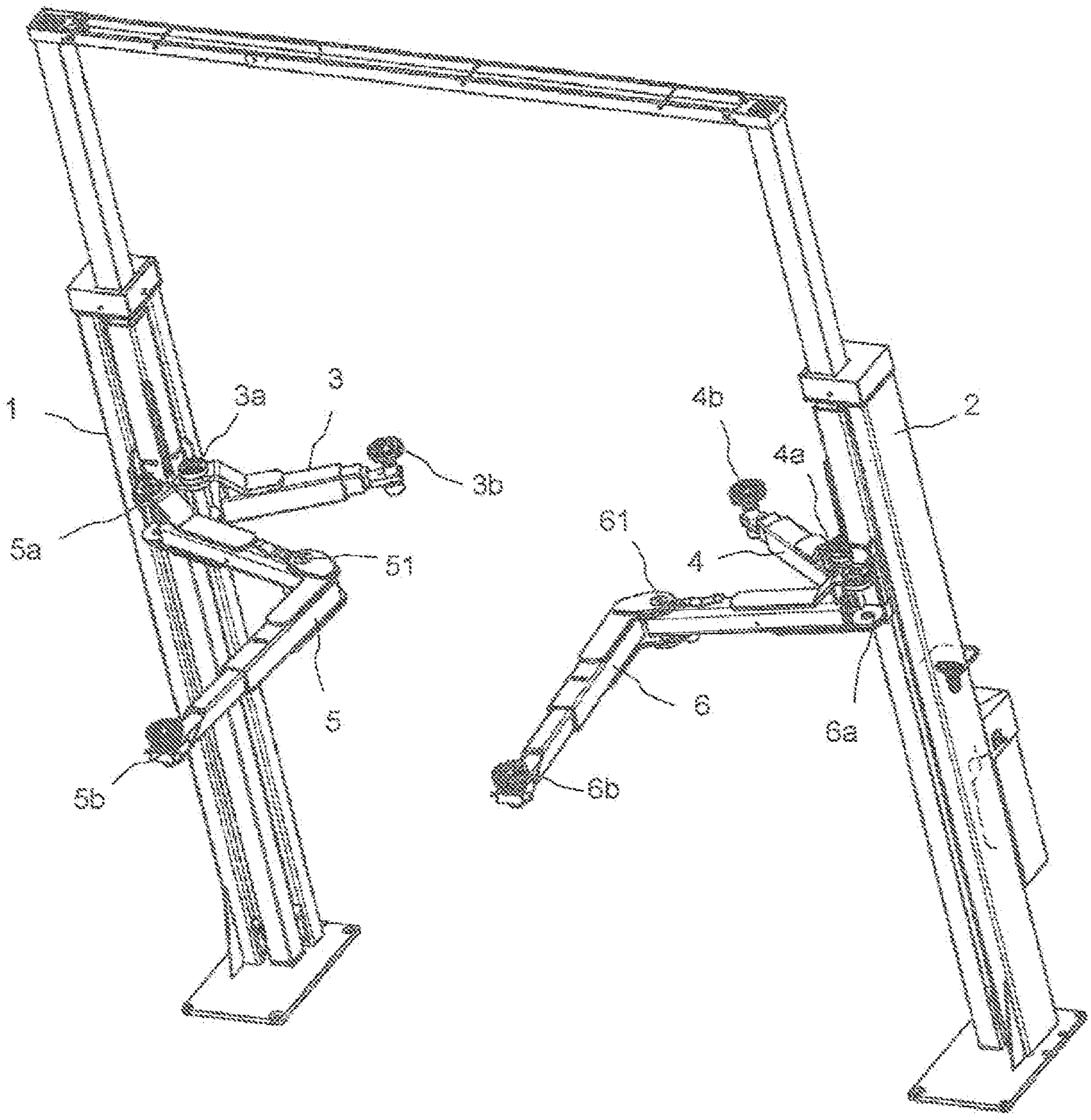
FIG. 5 shows the lifting platform from FIG. 1 with articulated joints bent inwards.
Figure 6:
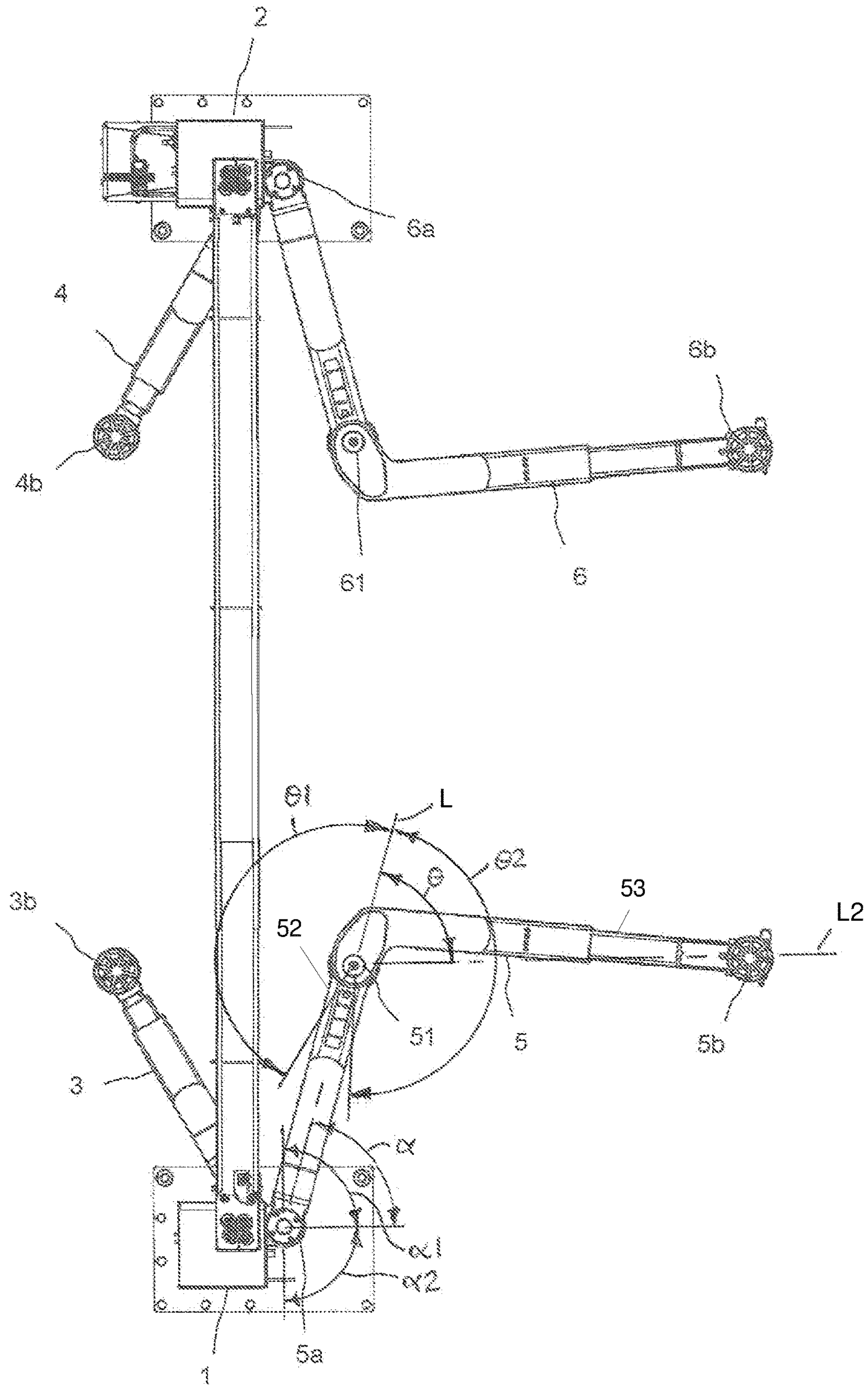
FIG. 6 is a plan view onto the lifting platform with the supporting arms positioned as shown in FIG. 5.
Figure 7:
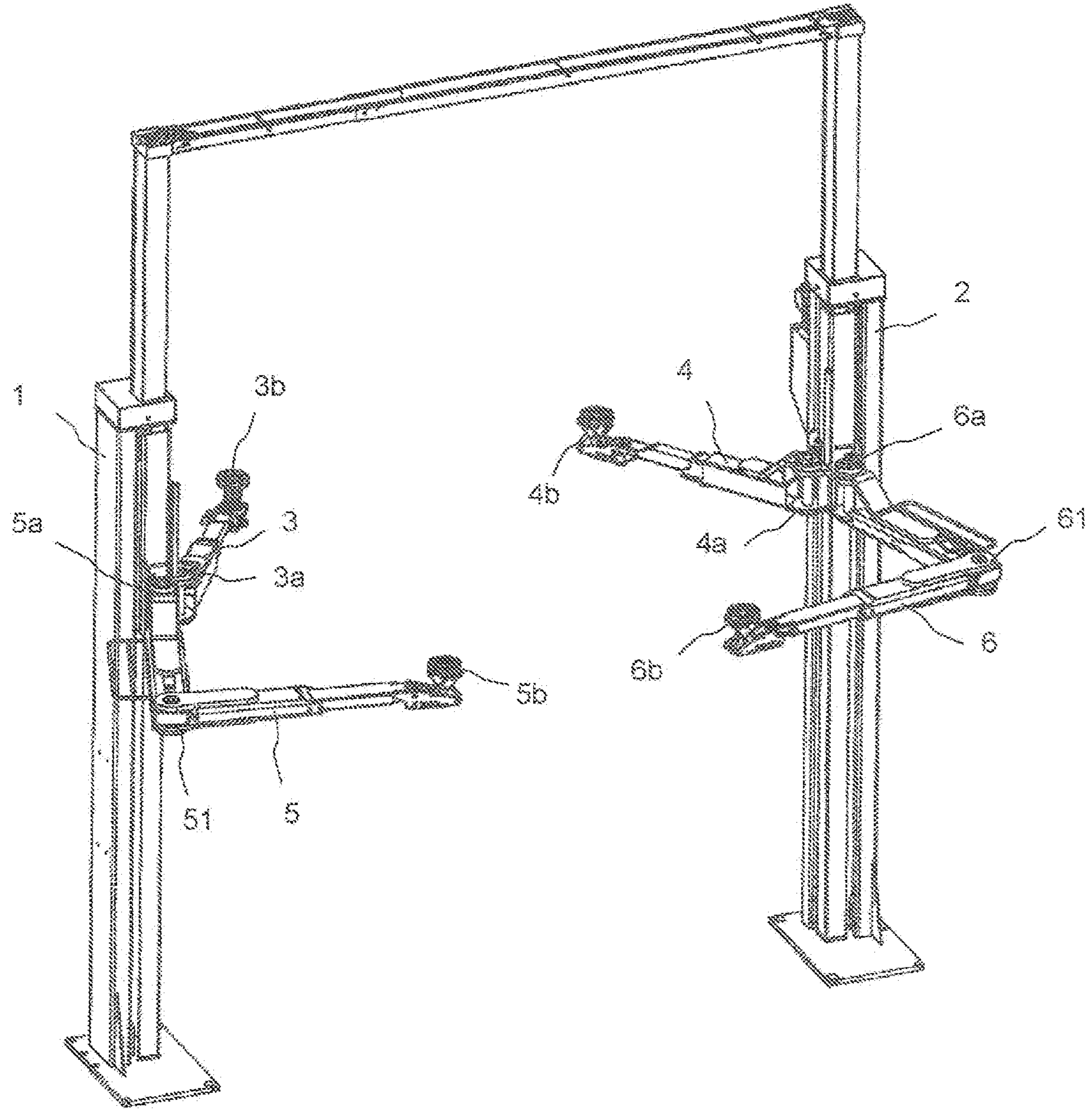
FIG. 7 shows a second exemplary embodiment of a two-column lifting platform, wherein the articulated joints of the double-jointed arms are angled outwards.
Figure 8:
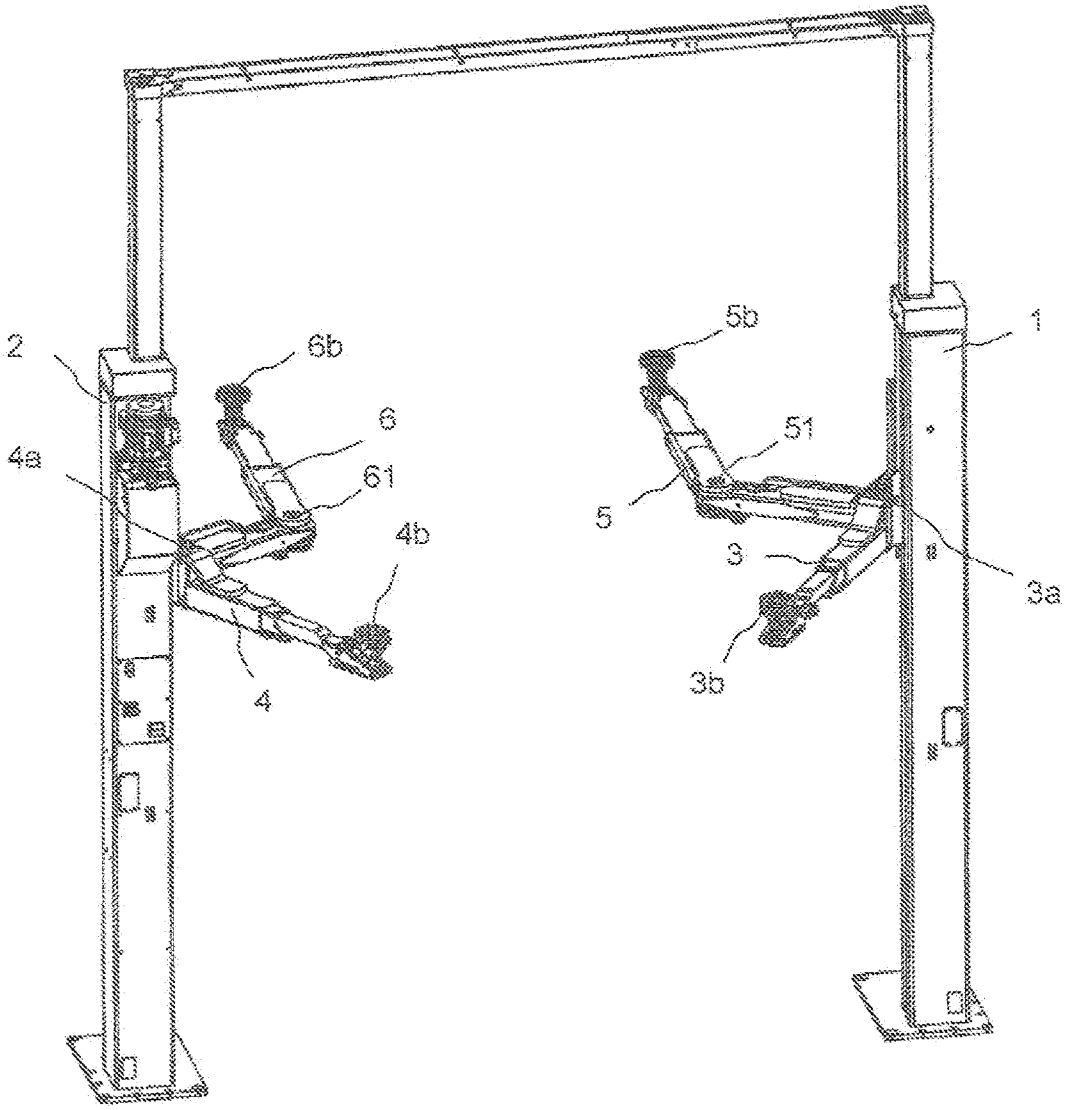
FIG. 8 shows the lifting platform from FIG. 7 with double-jointed arms angled inwards.

FIGS. 5 and 6 show the lifting platform in views corresponding to FIGS. 1 and 2, but in a position in which the articulated joints 51, 61 of the rear supporting arms 5, 6 have been bent inwards. For that purpose, the articulated joints 51, 61 are configured so that they do not have a stop in one of the two possible directions of bending—inwards or outwards—but are freely movable in both directions. The articulated joints therefore allow movement of the front-supporting-arm parts 53, 63 through almost 360°. Here 01 and 02 can both be at least 135° and more preferably up to about 170°. When the rear supporting arms are in the position shown in FIGS. 5 and 6, the articulated joints 51, 61 and the greater part of the rear supporting arms 5, 6 are located under the bottom of the vehicle so as to provide a relatively large, free working space in the region of the raised vehicle's lateral sills. Conversely, the articulated joints 51, 61 are positionable outwardly in an outer position that is adapted to be laterally outside of the motor vehicle being raised to provide a large, free working space under the bottom of the vehicle. The pivoting movement of the rear-part arm 52 first angle $\alpha$1 and the second angle $\alpha$2 are as discussed above. The pivoting movement angles of the rear supporting arm 6 would be the mirror image of that illustrated for the rear supporting arm 5.

Instead of being in the form of angled joints as shown in FIGS. 1 to 6, the articulated joints 51, 61 can for that purpose alternatively be implemented in the form of straight joints. Such an embodiment is shown in the second exemplary embodiment depicted in FIGS. 7 to 10.

In the second exemplary embodiment of a two-column lifting platform shown in FIGS. 7 to 10, identical or corresponding features have been given the same reference signs as in the first exemplary embodiment. Unlike the first exemplary embodiment, however, the articulated joints 51, 61 of the two double-jointed arms 5, 6 are implemented in the form of straight joints (i.e., they are not angled joints). This enables the two front-supporting-arm parts 53, 63 to have an even greater pivoting range in both pivoting directions. Here 01 and 02 shown in FIG. 10 can both be at least 90°, and more preferably up to about 135°. The pivoting movement of the rear-part arm 52 first angle $\alpha$1 and the second angle $\alpha$2 are as discussed above. The pivoting movement angles of the rear supporting arm 6 would be the mirror image of that illustrated for the rear supporting arm 5. In addition, for greater ease of handling, a U-shaped bracket 57, 67, which serves as a handle, is welded to each of the rear-supporting-arm parts 52, 62.

Figure 9:
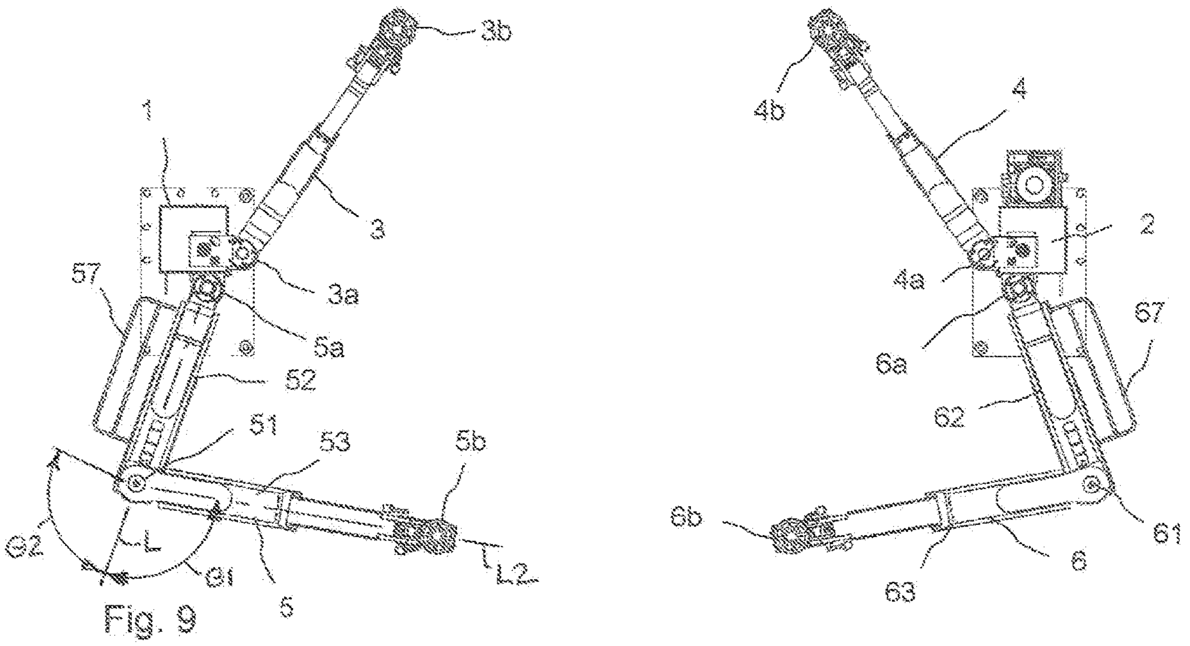
FIG. 9 is a horizontal section through the lifting platform in the position shown in FIG. 7, wherein the section plane runs through the lifting columns above the supporting arms.
Figure 10:
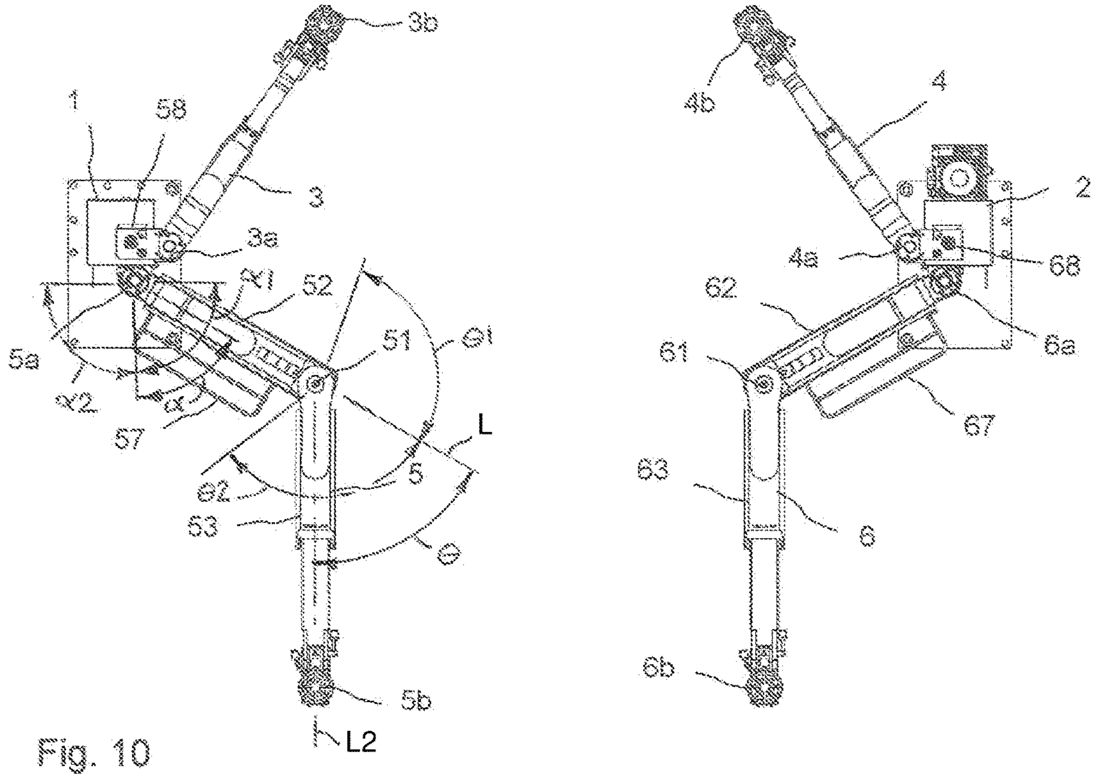
FIG. 10, in a view corresponding to FIG. 9, shows the lifting platform in the position shown in FIG. 8.

In the sectional views shown in FIGS. 9 and 10, the short, rigid supporting arms 3, 4 are articulated on the inner side of the two lifting columns 1, 2, while the articulation points 5*a*, 6*a* of the two double-jointed arms 5, 6 are located on the rear side of the lifting columns 1, 2, as seen in the drive-in direction. The pivot joints 3*a*, 5*a* and 4*a*, 6*a* of the supporting arms 3, 5 and 4, 6, respectively, are mounted in a manner known per se on a corresponding carriage 58, 68, respectively, which is movable vertically along the respective lifting columns 1 and 2 and guided along the lifting path in the lifting column. By means of the lifting mechanism (e.g., hydraulic drive, spindle drive, or chain drive), the height of that carriage 58, 68 is adjusted for raising or lowering the supporting arms 5, 6.

Other Aspects and Embodiments

The foregoing detailed description and accompanying figures set forth typical embodiments of lifting platforms for motor vehicles. The present disclosure is not limited to such exemplary embodiments. It will be apparent that numerous other lifting-platform embodiments may be provided in accordance with the present disclosure. The present disclosure may utilize any variety of aspects, features, or steps, or combinations thereof. The figures may be schematic representations that are not necessarily drawn to scale.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents.

The invention claimed is:

1. A lifting platform for motor vehicles, the lifting platform comprising:

a lifting device; and four supporting arms pivotally mounted on the lifting device, comprising each of the supporting arms being pivotable about a respective articulation point on the lifting device, wherein:

the supporting arms respectively comprise free ends, and the supporting arms are configured so that the free ends are movable under support points of a motor vehicle being raised by the lifting platform, the supporting arms form a first pair of supporting arms and a second pair of supporting arms, at least the supporting arms of the first pair of supporting arms are adjustable in length, comprising the supporting arms of the first pair of supporting arms being configurable in a retracted state, the supporting arms of the first pair of supporting arms are rigid between their articulation points on the lifting device and their free ends, so that the supporting arms of the first pair of supporting arms are pivotable solely about their articulation points on the lifting device, the supporting arms of the second pair of supporting arms are double-jointed arms, comprising the supporting arms of the second pair of supporting arms each comprising an articulated joint, the supporting arms of the second pair of supporting arms are at least twice as long as the supporting arms of the first pair of supporting arms in the retracted state, and the articulated joints are configured so that, for positioning under the support points of the motor vehicle being raised, each of the supporting arms of the second pair of supporting arms, starting from a maximally extended position of the supporting arm, can be bent horizontally in both directions by at least +/−45° from a medial position, normal to a line extending between the lifting columns, such that the articulated joints are positionable inwardly in an inner position that is adapted to be underneath the motor vehicle being raised or outwardly in an outer position that is adapted to be laterally outside of the motor vehicle being raised.

2. The lifting platform according to claim 1, wherein each of the supporting arms of the second pair of supporting is activatable to lock the articulated joint of the supporting arm before the motor vehicle is raised.

3. The lifting platform according to claim 1, wherein at least the supporting arms of the first pair of supporting arms are at least three-part telescopic supporting arms.

4. The lifting platform according to claim 1, wherein each of the supporting arms of the second pair of supporting arms comprises a rear-supporting-arm part and a front-supporting-arm part connected to one another by way of the articulated joint, and the front-supporting-arm part is telescopically adjustable in length.

5. The lifting platform according to claim 4, wherein the front-supporting-arm part is pivotable from a second medial position defined by a longitudinal arm axis of the rear-supporting-arm part by a first positioning angle inwardly, and by a second positioning angle (θ2) outwardly that are both 90° or greater.

6. The lifting platform according to claim 4, wherein the front-supporting-arm part is at least a two-part telescopic arm.

7. The lifting platform according to claim 1, wherein for positioning the supporting arms of the second pair of supporting arms under the motor vehicle being raised, the articulated joints of the supporting arms of the second pair of supporting arms can be bent inwards so that the free ends of the supporting arms of the second pair of supporting arms become closer to one another.

8. The lifting platform according to claim 1, wherein the lifting device comprises two lateral lifting columns.

9. The lifting platform according to claim 8, wherein:
- the articulation points of the supporting arms of the first pair of supporting arms are mounted on an inner side of each of the lateral lifting columns that faces towards the opposite lateral lifting column, and
- the articulation points of the supporting arms of the second pair of supporting arms are located on a front or rear side of each of the lateral lifting columns.

10. The lifting platform according to claim 8, wherein the supporting arms of the second pair of supporting arms are longer than the supporting arms of the first pair of supporting arms, and, for raising the motor vehicle, the first and second pairs of the supporting arms are positionable so that the lifting columns of the lifting platform are at the level of, or in front of, an A-column of the motor vehicle.

11. The lifting platform according to claim 1, wherein:
- the first pair of supporting arms is a front pair of supporting arms; and
- the second pair of supporting arms is a rear pair of supporting arms.

12. The lifting platform according to claim 11, wherein:
- at least the supporting arms of the front pair of supporting arms are at least three-part telescopic supporting arms;
- each of the supporting arms of the rear pair of supporting arms comprises a rear-supporting-arm part and a front-supporting-arm part connected to one another by way of the articulated joint, and the front-supporting-arm part is telescopically adjustable in length; and
- for positioning the supporting arms of the rear pair of supporting arms under the motor vehicle being raised, the articulated joints of the supporting arms of the rear pair of supporting arms can be bent inwards so that the free ends of the supporting arms of the rear pair of supporting arms become closer to one another.

13. The lifting platform according to claim 12, wherein:
- the lifting device comprises two lateral lifting columns;
- the articulation points of the supporting arms of the front pair of supporting arms are mounted on an inner side of each of the lateral lifting columns that faces towards the opposite lateral lifting column; and
- the articulation points of the supporting arms of the rear pair of supporting arms are located on a front or rear side of the lateral lifting columns.

14. The lifting platform according to claim 13, wherein the supporting arms of the rear pair of supporting arms are longer than the supporting arms of the front pair of supporting arms, and, for raising the motor vehicle, the first and second pairs of the supporting arms are positionable so that the lifting columns of the lifting platform are at the level of, or in front of, an A-column of the motor vehicle.

15. The lifting platform according to claim 1, wherein the supporting arms of the second pair of supporting arms, starting from the maximally extended position of the supporting arm, can be bent horizontally in both directions by +/−90° from the medial position.

16. A lifting platform for motor vehicles, the lifting platform comprising:
- a lifting device; and
- four supporting arms pivotally mounted on the lifting device, comprising each of the supporting arms being pivotable about a respective articulation point on the lifting device, wherein:
- the supporting arms respectively comprise free ends, and the supporting arms are configured so that the free ends are movable under support points of a motor vehicle being raised by the lifting platform,
- the supporting arms form a first pair of supporting arms and a second pair of supporting arms,
- at least the supporting arms of the first pair of supporting arms are adjustable in length, comprising the supporting arms of the first pair of supporting arms being configurable in a retracted state,
- the supporting arms of the first pair of supporting arms are rigid between their articulation points on the lifting device and their free ends,
- the supporting arms of the second pair of supporting arms are at least twice as long as the supporting arms of the first pair of supporting arms in the retracted state,
- each of the supporting arms of the second pair of supporting arms comprises an inner-supporting-arm part and an outer-supporting-arm part connected to one another by way of an articulated joint, and
- the articulated joints are configured so that, for positioning under the support points of the motor vehicle being raised, each of the supporting arms of the second pair of supporting arms, starting from a maximally extended position of the supporting arm, can be bent horizontally in both directions by at least +/−45° from a medial position, normal to a line extending between the lifting columns, such that the articulated joints are positionable inwardly in an inner position that is adapted to be underneath the motor vehicle being raised or outwardly in an outer position that is adapted to be laterally outside of the motor vehicle being raised.

17. The lifting platform according to claim 16, wherein at least the supporting arms of the first pair of supporting arms are at least three-part telescopic supporting arms.

18. The lifting platform according to claim 16, wherein the outer-supporting-arm parts are telescopic.

19. The lifting platform according to claim 16, wherein for positioning the supporting arms of the second pair of supporting arms under the motor vehicle being raised, the articulated joints of the supporting arms of the second pair of supporting arms can be bent inwards so that the free ends of the supporting arms of the second pair of supporting arms become closer to one another.

20. The lifting platform according to claim 16, wherein:

the lifting device comprises two lateral lifting columns;

the articulation points of the supporting arms of the first pair of supporting arms are mounted on an inner side of each of the lateral lifting columns that faces towards the opposite lateral lifting column; and the articulation points of the supporting arms of the second pair of supporting arms are located on a front or rear side of each of the lateral lifting columns.

* * * * *